Oct. 23, 1962 C. D. SALTZMAN 3,059,849
WATER METER ACCESSORY
Filed March 26, 1957 5 Sheets-Sheet 1
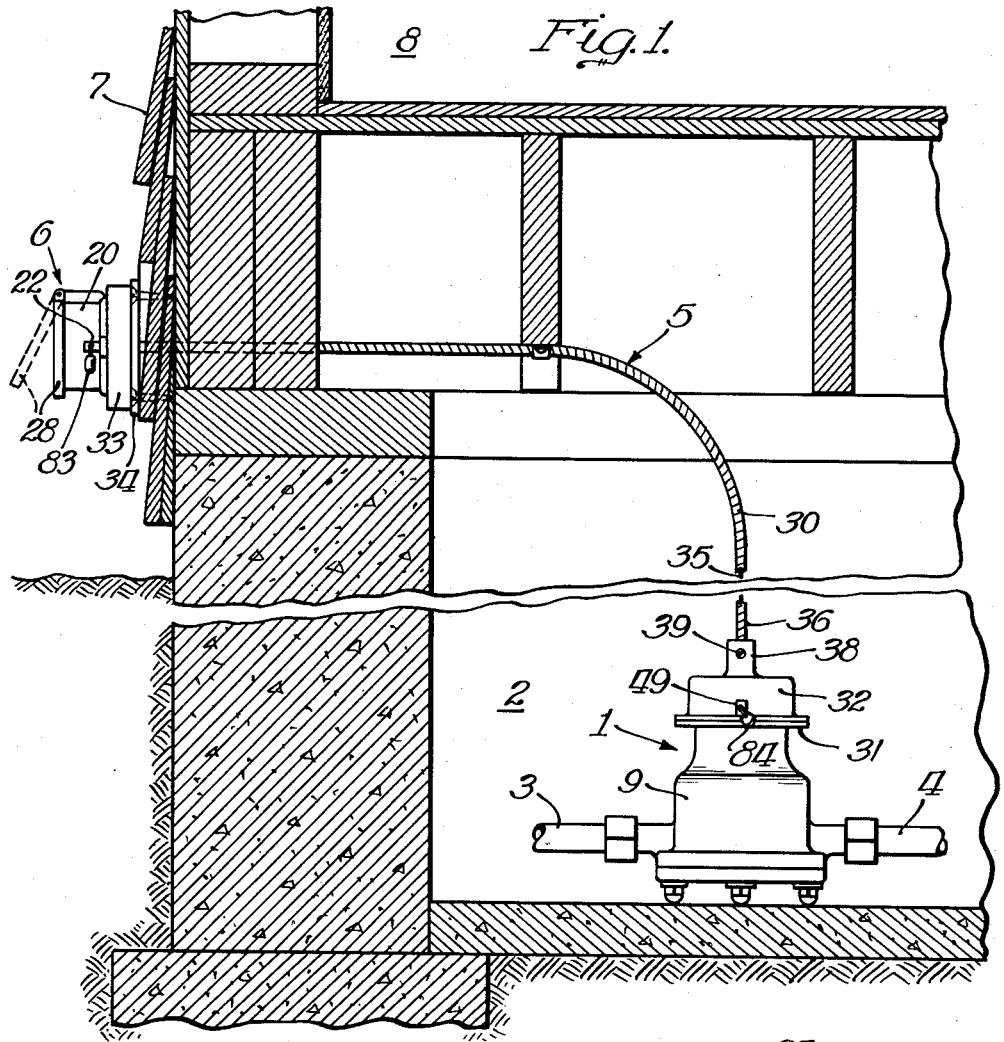
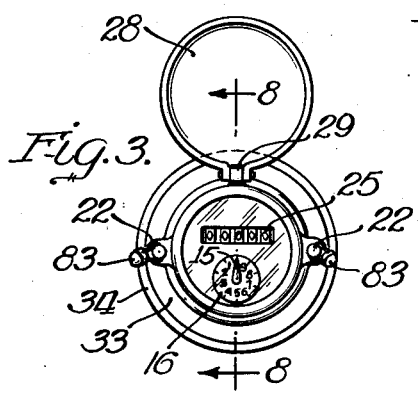
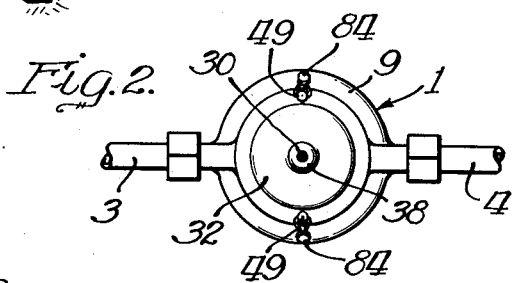
INVENTOR:
Curtis D. Saltzman
BY
Eberhard E. Wetley
Atty.

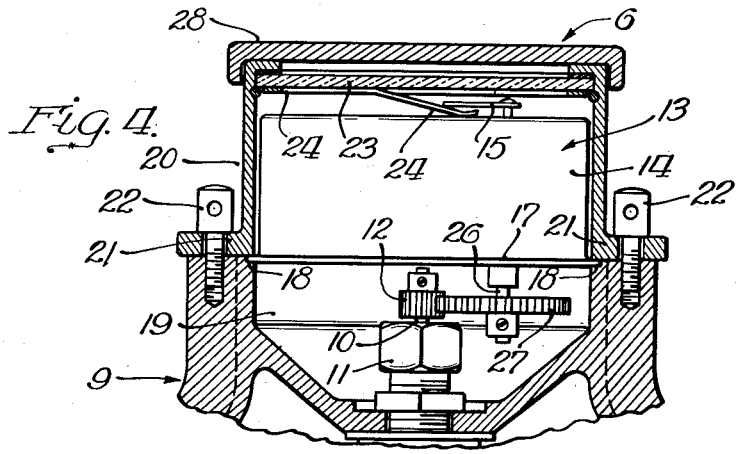
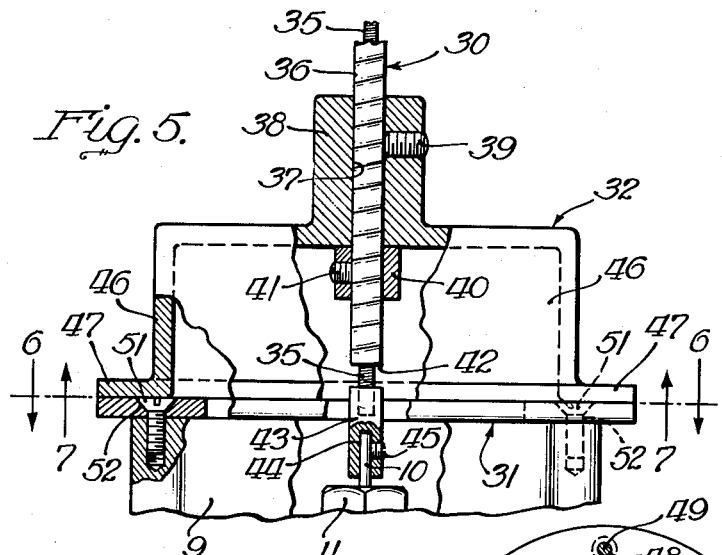
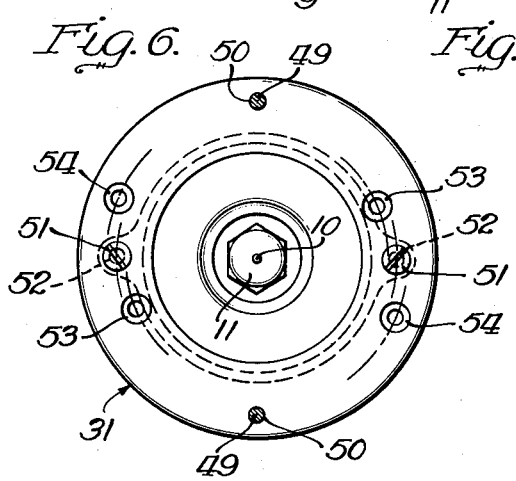
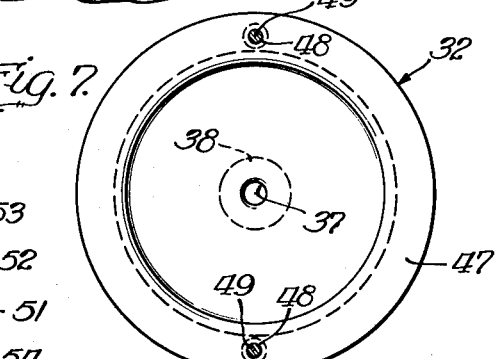

Oct. 23, 1962 C. D. SALTZMAN 3,059,849
WATER METER ACCESSORY
Filed March 26, 1957 5 Sheets-Sheet 3
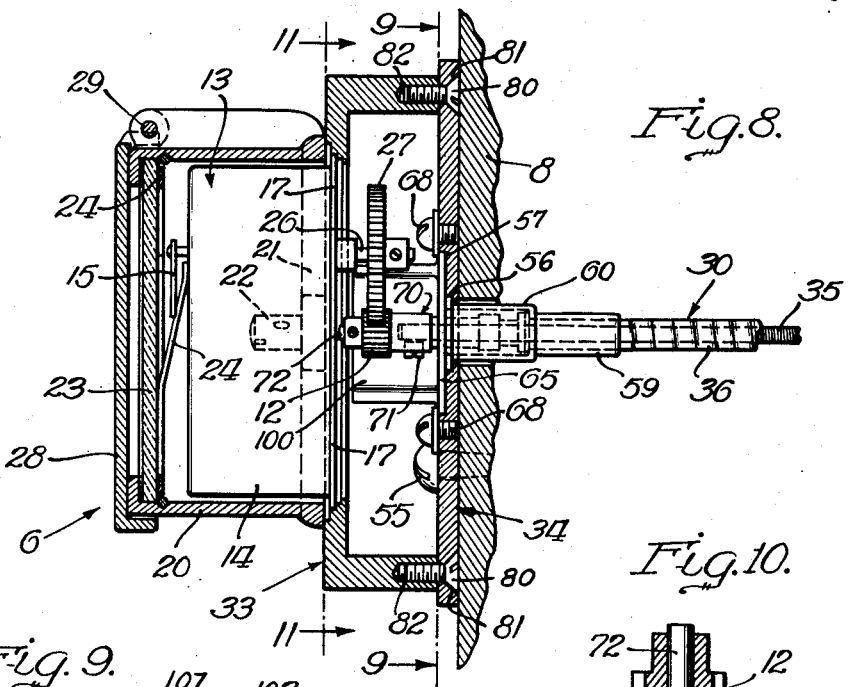
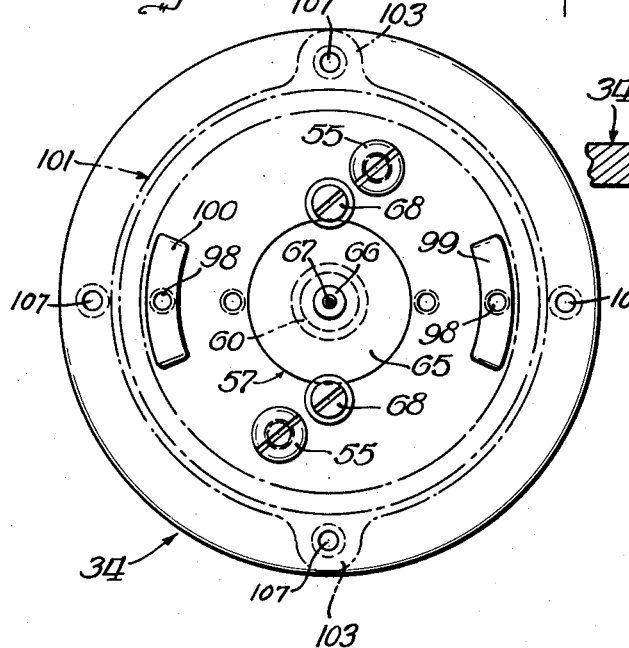
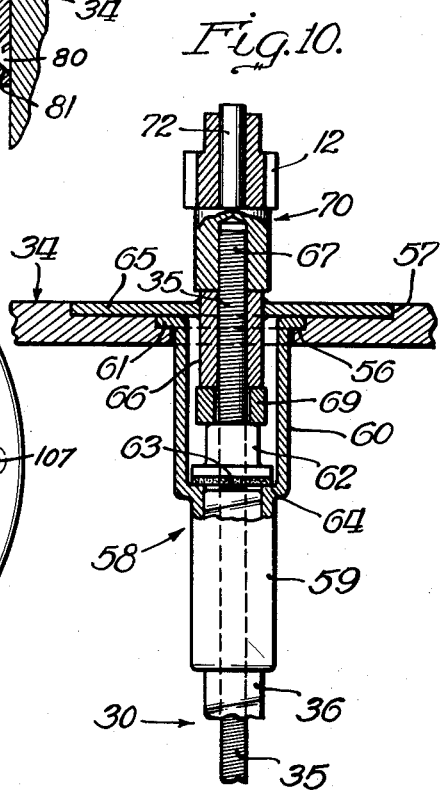
INVENTOR:
Curtis D. Saltzman
BY
Eberhard E. Wostley
Atty.

Oct. 23, 1962     C. D. SALTZMAN     3,059,849
WATER METER ACCESSORY
Filed March 26, 1957     5 Sheets-Sheet 4
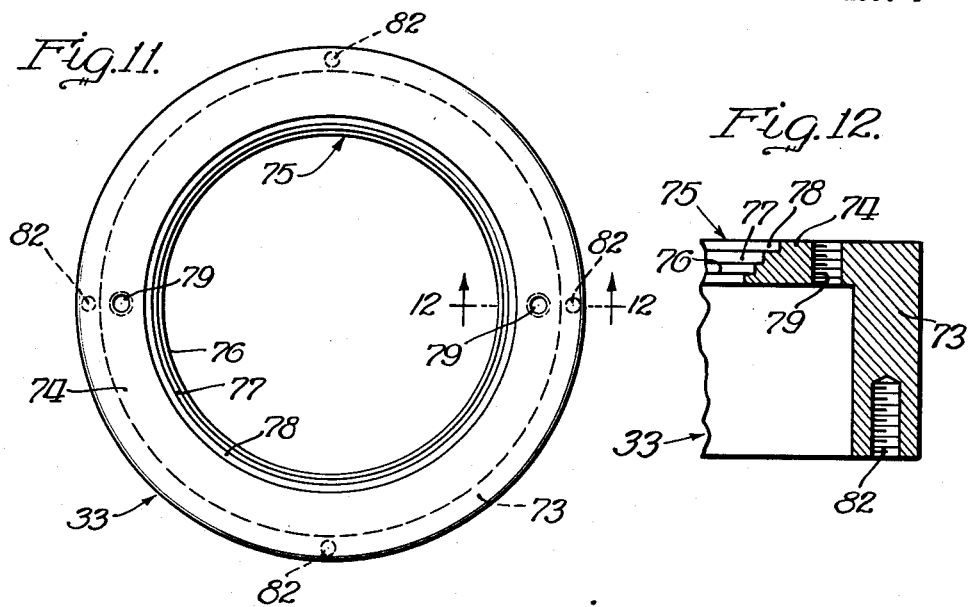
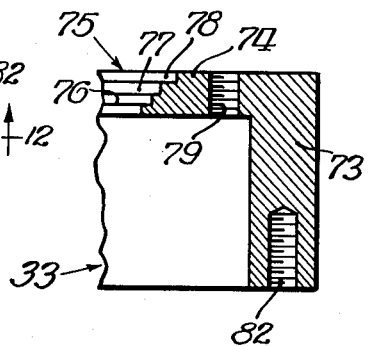
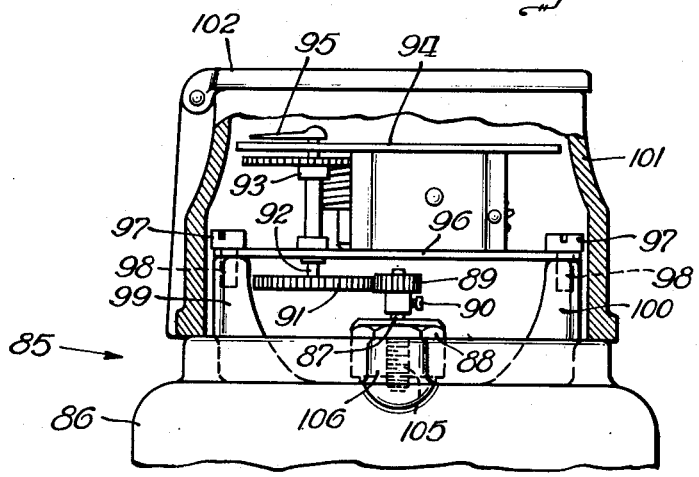
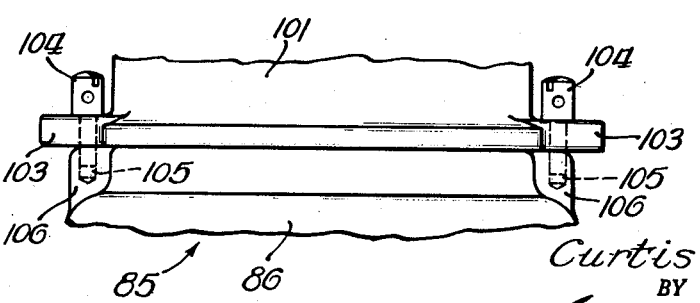
INVENTOR:
Curtis D. Saltzman
BY
Eberhard E. Watley
Atty.

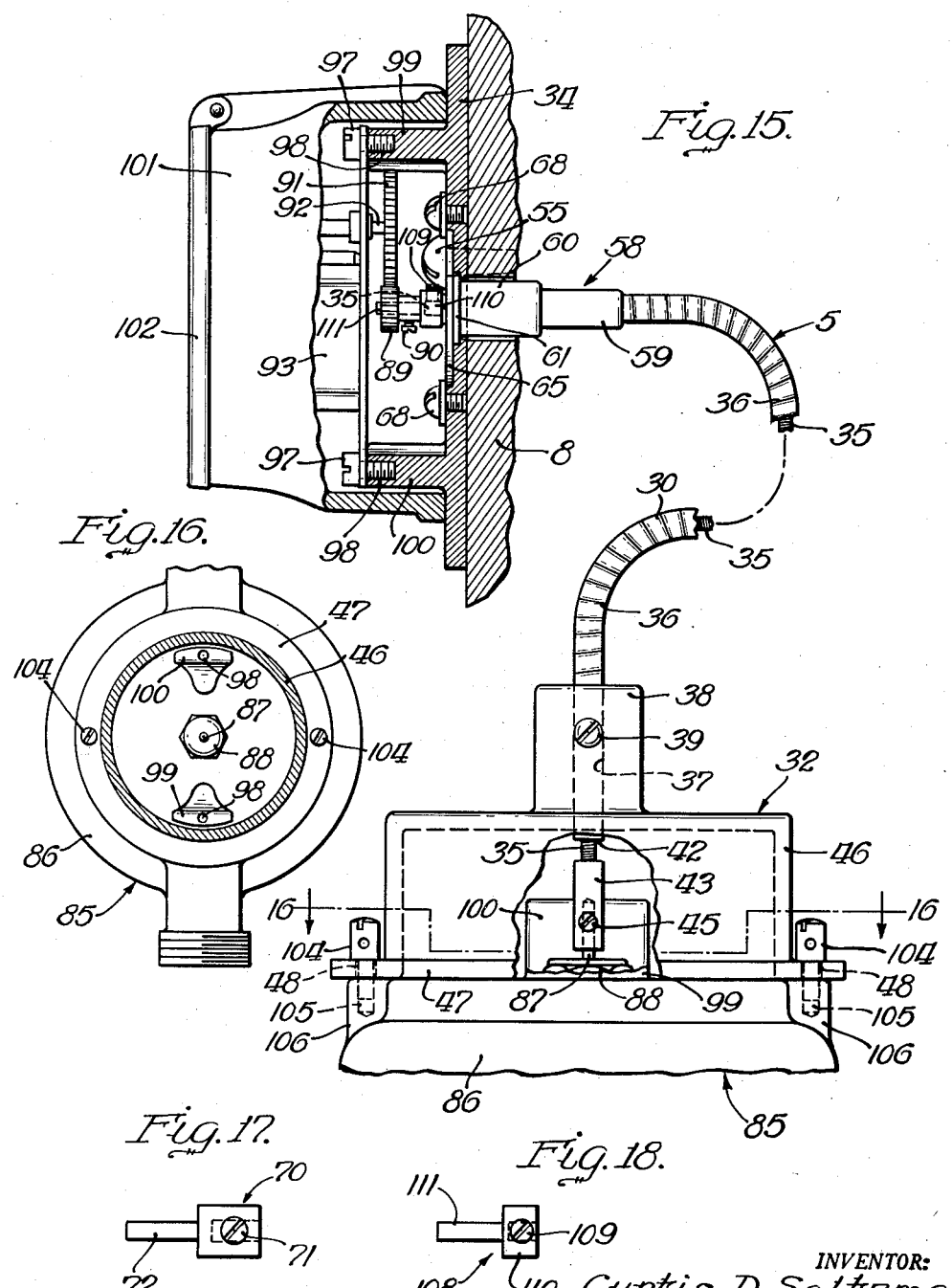

United States Patent Office 3,059,849
Patented Oct. 23, 1962

3,059,849
WATER METER ACCESSORY
Curtis D. Saltzman, Ohio, Ill.
Filed Mar. 26, 1957, Ser. No. 648,702
7 Claims. (Cl. 235—91)

This invention relates to a drive transmission mechanism for water meters or similar metering devices having registering dial means that must be periodically read by various individuals for recordal or for other purposes.

Primarily the invention has to do with an extension accessory drive means that can be universally applied to any one of many water meters to permit bodily separation of the registering mechanism from the flow measuring meter assemblies thereof to accommodate the relocation of the registering mechanisms into easily accessible and readily readable positions preferably at exterior locations on dwellings equipped with water meters.

One of the objects of this invention is to provide a simple and inexpensive drive accessory mechanism that may be interposed between the indicating register of a meter and the meter assembly per se, by separation of such main named units, to permit locating the register in a place readily accessible for a meter reader without affecting the location of the flow measuring meter assembly in a cellar or basement.

Another object is to provide a drive accessory mechanism which is universally adaptable for installation on all popular and widely used makes of water meters.

A further object of this invention is to provide a drive accessory means that utilizes the same drive members that normally form coacting standard parts of a meter and register to thereby eliminate the necessity of using special driving units that may be objectionable in meter installations and which may introduce inaccuracies into the operation of a meter that are not in accord with the designed purpose and operation of such a meter.

As a further object this invention permits the application of standard screw sealing devices in relation to the added accessory means and which sealing devices are of the kind that are commonly used to prevent tampering with a register or with a meter as the case may be.

Other objects and advantages relating to a drive extension accessory for meters of the kind herein disclosed shall hereinafter be explained and described or will become apparent in the following detailed description directed in detail to the invention with reference to the accompanying drawings forming a part of this specification.

In the drawings:

FIG. 1 is a general installation of a water meter and its register as these units would appear under remote separation by means of the extension drive transmission mechanism exemplifying one embodiment of the present invention;

FIG. 2 illustrates a plan view of the water flow measuring meter shown in FIG. 1 and using the extended drive means of the invention;

FIG. 3 is a face or front elevational view of the meter register as it appears when mounted upon the exterior wall of a dwelling as shown in FIG. 1;

FIG. 4 is a vertical cross sectional view of the upper portion of one standard type of water meter as it appears under its normally assembled condition;

FIG. 5 is an enlarged side elevational view of the upper part of the meter shown in FIG. 1 with portions thereof broken away and shown in section to illustrate certain details of the construction thereof;

FIG. 6 is a plan sectional view of a portion of the accessory equipment as it appears when looking downwardly along the plane of the line 6—6 in FIG. 5;

FIG. 7 represents a bottom plan view of a portion of the accessory equipment as the same appears when viewed upwardly along the plane of the line 7—7 in FIG. 5;

FIG. 8 is a vertical sectional view of the register end of the accessory equipment and of the register substantially as these units would appear when seen along the plane of the line 8—8 in FIG. 3 but with the cover closed.

FIG. 9 is a side or elevational face view of another element of the accessory equipment as it appears when seen along the plane of the line 9—9 in FIG. 8;

FIG. 10 represents an enlarged plan view of one end of the drive means of the drive accessory mechanism shown in section for the greater part thereof and along an axial plane;

FIG. 11 is a plan view of a register receiving and supporting adapter ring or member per se that constitutes one of the several elements of the drive accessory assembly shown in FIG. 8;

FIG. 12 is a transverse cross sectional view of a fragmentary part of the supporting adapter ring taken along the plane of the line 12—12 in FIG. 11;

FIG. 13 represents a side elevational view of the upper end of a portion of another type of meter with portions thereof broken away and shown in section to better illustrate certain details of the construction thereof;

FIG. 14 is a fragmentary side elevational view of the register parting line portion of the meter shown in FIG. 13 as this arrangement appears under the normal meter assembly thereof;

FIG. 15 is another general view of installation of the extension drive accessory means as applied to a meter of the nature shown in FIGS. 13 and 14;

FIG. 16 is a detailed plan sectional view of the meter end of the installation as it would substantially appear when viewed along the plane of the line 16—16 in FIG. 15; and FIGS. 17 and 18 are side elevational views of the coupling members that are used in completing the drive between certain parts of the accessory equipment.

Referring now to FIG. 1, the meter 1 here illustrated is a Hersey water meter located in a cellar or basement 2 for measuring water flow through the inlet and outlet dwelling water supply pipes 3 and 4. The drive means of the meter is connected with the extension drive accessory equipment 5 that leads from meter 1 to the meter register assembly 6 suitably secured to an outer wall 7 of a dwelling 8. This register is readily accessible for reading in the position where located without necessitating a cellar or basement entry by a meter reader each time such a reading is made.

The meter 1 is best illustrated in FIG. 4 in its normal assembled condition and without any change or introduction of the drive extension 5 of the present invention. Briefly, this construction entails the usual meter housing 9 that carries the water flow measuring mechanism that connects in a conventional manner to drive a spindle 10 that projects out of the stuffing box unit 11 and which spindle is securely attached to and drives the pinion or gear 12. The register is shown at 13 and it is provided with an enclosure or housing 14 having the small increment pointer 15 to read the dial 16 and register numbers as shown in FIG. 3. Housing 14 terminates in a peripheral bottom flange 17 that seats in a fitted annular recess 18 surrounding the mouth 19 of the housing 9. The register 13 is held seated or in place by means of the hood 20 having a flange 21 that abuts the top of the flange 17 and the hood is secured by means of the seal screws 22. The hood 20 also has a glass window 23 and a circular multiple spring unit 24 is interposed between the glass and top portions of the register 13 to keep the latter from accidental rotation within its annular recess 18.

The register 13 includes the counting mechanism numeral wheels 25 shown in FIG. 3 and the drive spindle 26 for the mechanism 25 depends downwardly as shown in FIG. 4, and carries a gear or pinion 27 that meshes with and is driven by the pinion 12. Thus the meter mechanism drives the register through the gear means described and the register can be easily read through the hood glass window 23. A cover 28 is pivoted at 29 on the hood and provides means to normally keep the window of the register unit covered and protected.

While the explanation above is directed to the normal assembly of the Hersey meter 1, FIG. 1 shows the same meter with the register unit 13 and hood 20 removed and placed in the remote location shown, with the meter 1 remaining in its installed location on the floor of the cellar to measure the water flow through pipes 3 and 4.

The accessory equipment 5 comprises, as the principal elements thereof, a length of flexible drive cable 30, a bonnet 32, an adapter 31 for the bonnet, a register support 33 and a securing plate 34. The flexible drive cable comprises given lengths of a drive shaft 35 and sheath 36. The meter end of cable 30 passes through an opening 37 in the boss 38 of bonnet 32 and the cable is held in place by a set screw 39. Additional cable restraining means such as the locking collar 40 and set screw 41 may be employed to counteract forceful withdrawal of the cable 30 from the bonnet 32. As shown in FIG. 5, the sheath 36 terminates at 42 and the housed flexible shaft 35 is secured to a coupling sleeve 43 that has a bore 44 to receive the end of the meter spindle 10 and a set screw 45 to secure the sleeve to the spindle.

The balance of the meter end of the construction of the accessory drive means 5 is best shown and understood with reference to FIGS. 5, 6 and 7. The bonnet 32 is made with a cylindrical housing 46 terminating in a flange 47 that carries at least two holes 48 to receive the securing seal screws 49 therethrough and which screws thread into the screw openings 50 in the adapter 31 as shown in FIGS. 6 and 7. Thus the bonnet 32 and adapter 31 are mates for assembly purposes in view of the differences or variations that are encountered in the spacings of the register and meter assembling screws in certain meters and such as shown by the screws 51 and FIG. 5.

The adapter is well shown in FIG. 6 and it is made with multiple sets of screw receiving openings to permit its use on certain other meters using somewhat different screw spacings as can be understood from the one example shown in FIG. 5. The adapter 31 is, therefore, supplied with pairs of countersunk openings 52, 53 and 54 with openings 52 accommodating the screws 51. With the mated combination the adapter and bonnet arrangement, this meter end of the accessory means can be used for most of the many popular installed meters having or falling within the limits of the fastening provisions provided for by the adapter plate 31.

Referring now to FIGS. 8, 9 and 10, the register assembly is shown as moved to an outdoor position like illustrated in FIG. 1 and the flexible drive cable 30 and members 33 and 34 of the accessory equipment or means 5 cooperate and terminate at this position to support and to operate the register. Attention is directed to the securing plate 34 which has suitable openings to accommodate fastening screws 55 that anchor this plate to the wall 8 and this fastening means carries the adjacent end of the cable 30, the register supporting member 33 and the register 6 per se.

The central part of the plate 34 has a shouldered opening 56 and a larger annular recess 57 to provide cable orientation means. As noted in FIGS. 8 to 10, the cable 30 carries a thimble 58 having a sheath securing sleeve 59 and a large offset sleeve 60 flanged at 61 to seat within the shouldered recess or opening 56. The drive shaft 35 has a stop ferrule 62 rigidly secured thereto and is provided with a washer 63, both the ferrule and washer being made to abut the thimble shoulder 64 to hold the cable shaft 35 against motion within its sheath 36 in the direction of the meter. In addition, a bearing disc 65 with a hub 66 provide means to carry and stabilize the register end 67 of the cable 35, with a disc 65 seated in the recess 57 of plate 34 and being held in place by screws 68 best shown in FIGS. 8 and 9. A loose collar 69 is interposed between the hub 66 and ferrule 62 to prevent endwise motion of the cable shaft 35 in the direction of the register. For all practical considerations, the hub 66 may be made oversize in length and to be cut off to a predetermined length to abut the ferrule 62 directly if that is desired under certain conditions of use.

As best shown in FIGS. 8 and 10, the end 67 of the cable carries a releasable drive coupling spindle 70 having a sleeve to receive end 67 of the shaft 35 to be secured by a set screw 71 and the coupling carries a spindle 72 to fit the meter driven pinion or gear 12 that has now been transferred from meter spindle 10 to the coupling spindle 72. Such couplings are illustrated in FIGS. 17 and 18, wherein FIG. 17 illustrates the coupling spindle 70 above referred to and described.

The cable arrangement is, therefore, oriented and installed to transmit the meter drive through the meter spindle 10 and cable embodiment shown in FIG. 5 to the meter driven pinion 12 now transposed to the position shown in FIGS. 8 and 10 where the pinion will function in its same capacity to drive the register mechanism through the pinion or gear 27 on the register spindle all comprising an assembled part of the register.

Referring to FIGS. 8, 11 and 12, the register support 33 constitutes a cylindrical spacer comprising a continuous enclosure wall 73 having an annular flange 74. Flange 74 is provided with a central opening 75 outlined by a multiple recess wall having successively larger shouldered recesses 76, 77 and 78 to accommodate various sizes of register body flanges such as 17. With the meter register use in FIG. 8, flange 17 rests within recess 77 and the base portion of the hood 20 rests upon the flange 74 of the support 33. The seal screws 22 are now employed to secure the hood structure to the support ring 33 by means of the ears 21 on the hood and spring 24 holds the register downwardly upon the recess and prevents rotation of the unit.

Screws 22 enter threaded openings or bores 79 in the flange 74 and the register support or ring 33 is fixedly secured to the plate 34 through a number of screws 80 passing through countersunk openings 81 in the back of the plate and threading into threaded bores 82 formed in the rim portion of ring 33. The coactive securement of members 33 and 34 with the cable positioning means carried by the plate 34 and with the register positioning means associated with the ring 33 provides a complete and foolproof arrangement for proper meter drive transmission through means 5 to operate the register in the same positive manner as would normally be the case with the meter and register units coacting and assembled as shown in FIG. 4. Tampering with the meter arrangement is prevented by the usual commercial wire seals 83 applied to seal screws 22 at the register end shown in FIG. 1, with further wire seals 84 being applied to seal screws 49 at the meter end of the same assembly.

The accessory equipment described is designed for installation in one large group of various makes of meters that fall within the size range accommodations discussed in relation to the variations provided in the layout of the adapter plate means 31 and in the register supporting means 33. Another range of meters provides another large group that can be supplied with substantially the same equipment to accommodate easy and simple register and meter separation. Such meters will now be described with reference to FIGS. 13 to 16 and wherein the same common elements and units of the accessory drive means will be indicated by like reference numerals.

FIGS. 13 and 14 relate to a Niagara meter 85 having a housing 86 carrying the conventional operative flow measuring mechanism that drives a spindle 87 which protrudes from the meter stuffing box or gland 88. The spindle 87 has a drive gear or pinion 89 secured thereto by a set screw 90 and pinion 89 meshes with a gear or pinion 91 that positively drives spindle 92 connected into the usual numeral and counting mechanism 93 interposed between a dial 94 having a pointer 95 and a base plate 96. The base plate 96 has suitable openings to accommodate a pair of securing screws 97 that thread into bores 98 of a pair of upstanding lugs 99 and 100 comprising portions of the meter housing 86. A hood 101 with pivoted cover 102 encloses the register means and the hood provides a glass window as in the other described meter hood to protect the dial, etc., and to permit easy meter reading. The hood 101 has lateral ears 103 that are apertured to accommodate the seal screws 104 that thread into the bores 105 in bosses 106 on the housing 86.

Removal of the seal screws 104 will permit separation of the register unit from the meter proper and with the introduction of the accessory equipment, the entire arrangement will then appear like that shown in FIG. 15. With this type of a meter, the bonnet 32 can be directly attached to the top of the meter 85 upon the housing 86 since holes 48 permit reintroduction of seal screws 104 into the meter bores 105 in lugs or bosses 106. Coupling sleeve 43 of the drive cable 30 receives the end of the drive spindle 87 which is firmly connected with the coupling with set screw 45. Another set of securing seal screws like 104 can then be used to attach the hood 101 to the meter housing 86 as in FIG. 15. The original or similar seal screws are used to attach the register through holes in the latter by entry into one diametral pair of the threaded holes such as 107 provided for this purpose in the securing plate 34.

Similar to the first described installation with the Hersey meter, a coupling spindle 108 is used to connect the register end of the flexible shaft 35 with the drive pinion 89 after the latter is removed from the meter spindle 87. This coupling is best shown in FIG. 18 and includes a set screw 109 for the shaft socket portion 110 which carries a stub spindle 111 to fit into the bore of the gear or pinion 89 when assembled as seen in FIG. 15. The coupling units such as 70 and 108 demonstrate how a simple form screw machine part of the character noted can be employed to accommodate variations in the bores of the drive gears or pinions of a number of meters and how the socket portions of the couplings can be varied to take care of variable axial positions of the connected parts for different setups.

To demonstrate the versatility of the accessory drive equipment, the following list shows the combination of the various parts of the drive extension that are employed with the better known and commonly installed water meters.

|   | Type of Meter | Company | Accessory Parts |
|---|---|---|---|
| 1 | Trident | Neptune Meter Co | 31—32—33—34 |
| 2 | Lambert | Thompson Meter Co | 31—32—33—34 |
| 3 | Arctic | Rockwell Meter Co | 31—32—33—34 |
| 4 | Tropic | do | 31—32—33—34 |
| 5 | Federal Castings | | 31—32—33—34 |
| 6 | Hersey Castings | Hersey Mfg. Co | 31—32—33—34 |
| 7 | Badger (New Style) | Badger Meter Co | 31—32—33—34 |
| 8 | Badger (Old Style) | do | 32—34 |
| 9 | Niagara (New Style) | Buffalo Meter Co | 32—34 |
| 10 | Niagara (Old Style) | do | 32—34 |

Of the above list, No. 6 is the meter used in the arrangement first described with reference to FIGS. 1 to 12. The second variation or arrangement herein described relates to the Niagara meters listed under Nos. 9 and 10 above. Thus the No. 6 version shows the combination of all four main units 31—32—33 and 34; while the Nos. 9 and 10 meters illustrate the combination of only two of the main units 32 and 34.

Supplementing the list of water meters presented above, the accessory equipment is equally applicable to serve such meters that are supplied under the names of Worthington, Empire, Nash, Calmet and Watch Dog.

The general description relates to preferred forms of the mechanisms of the present invention. Certain changes in the individual elements or in the combinations thereof are contemplated without departure from the main inventive concept of the invention. The extent of such changes shall, however, be governed by the breadth and scope of the language defining the invention in the appended claimed subject matter.

What I claim is:

1. A mechanism to operatively couple a meter and its recording register upon separation of said units and to provide means to extend the drive between a register drive member on the meter to the drive wheel of the register, said mechanism comprising a sheath, a drive shaft confined for rotation within said sheath, and coupling assemblies connected with the opposite ends of the sheath and shaft, one of said coupling assemblies providing drive attaching means to connect with the register drive member of the meter, the other of said coupling assemblies comprising a mounting plate having orientation means to accommodate the register in a given relation thereon to dispose the register drive wheel in a fixed position with respect to said plate, a thimble connected with the sheath, said thimble having a flange thereon, said plate having an opening to receive said thimble therethrough and an annular shoulder surrounding said opening to receive the thimble flange therein from the register side of the mounting plate to hold said sheath against endwise movement relatively to said mounting plate, and orientation mechanism connected with the adjacent end of the shaft to counteract endwise motion of the shaft in either direction relatively to said sheath comprising a bearing element arranged radially to said shaft to overlie said thimble flange and having a sleeve to receive the shaft therethrough, securing means to fasten said bearing element to said plate, a drive spindle having a socket member secured to the terminal end of said shaft with a drive pinion on said spindle positioned upwardly above said mounting plate to mesh with the register drive wheel, said spindle socket member reacting against one end of the sleeve of said bearing element to hold said shaft against endwise movement in one direction, and retaining means connected with said shaft within said sheath thimble and disposed for engagement with the other end of the sleeve of the bearing element to hold said shaft against endwise movement in the opposite direction.

2. In the combination defined in claim 1, wherein said thimble flange occupies an exposed position at the register side of the mounting plate when oriented within the annular shoulder in said plate, and said bearing element is secured to said plate along a plane coincident with the surface area of said exposed flange of said thimble to hold said thimble flange firmly seated within the annular shoulder and in a fixed position wherein said thimble is safely locked against disassembly excepting from the register side of the mounting plate.

3. In the combination defined in claim 1, wherein said retaining means comprises a ferrule attached to the shaft in spaced relation to the adjacent end of the bearing element sleeve, and a spacing collar of a selected length is interposed between said sleeve and said ferrule to provide a given amount of shaft projection out of said bearing element sleeve for the reception of the socket member of said drive spindle thereon.

4. In the combination defined in claim 1, wherein said thimble and bearing element with its sleeve are disposed along a common axis, the thimble and its flange being circular and concentric to said axis, with said annular shoulder of said plate and said sleeve being circular and concentric about said same axis to permit thimble and plate assembly in any angular position of one relative to the other about said common axis.

5. In the combination defined in claim 4, wherein said securing means comprise fastening members carried by the plate radially beyond the periphery of said circular bearing element, said fastening members having portions thereof overhanging said element for surface contact against an axial face portion of said element.

6. In the combination defined in claim 1, wherein said one coupling assembly at the meter end of the drive mechanism comprises a bonnet having securing devices to attach the bonnet upon the meter in a given relation to the register drive member of the meter, said bonnet having coacting orientation means thereon to position said sheath in a given relation with respect to the register drive member and with the drive shaft extended within the bonnet in line with the register drive member, and a sleeve coupling is carried by said shaft to connect with said register drive member.

7. In the combination of claim 1, wherein said sheath is a flexible tubular unit and said drive shaft is a flexible cable.

References Cited in the file of this patent

UNITED STATES PATENTS

| | | |
|---|---|---|
| 212,387 | Kendall | Feb. 18, 1879 |
| 452,904 | Harris | May 26, 1891 |
| 502,958 | Griffin | June 5, 1894 |
| 994,441 | Burke | June 6, 1911 |
| 1,464,882 | Palmer | Aug. 14, 1923 |
| 1,683,033 | Helgeby | Sept. 4, 1928 |
| 1,947,937 | Hennig | Feb. 20, 1934 |
| 2,094,711 | Leininger | Oct. 5, 1937 |
| 2,268,174 | Spanko | Dec. 30, 1941 |
| 2,684,810 | Bryant | July 27, 1954 |
| 2,733,616 | Zimmerman | Feb. 7, 1956 |
| 2,735,697 | Zanin | Feb. 21, 1956 |